Sept. 27, 1927.

V. M. WADE ET AL 1,643,357

PARTITION ASSEMBLING MACHINE

Filed Dec. 1. 1925

7 Sheets-Sheet 1

INVENTORS
Verner M. Wade and Charles E. Zuspan
by William B. Wharton
their attorney Sept. 27, 1927.

V. M. WADE ET AL 1,643,357

PARTITION ASSEMBLING MACHINE

Filed Dec. 1, 1925

7 Sheets-Sheet 2

INVENTORS

Verner M. Wade and Charles E. Zuspan by William B. Wharton their attorney

INVENTORS
Verner M. Wade and Charles E. Zuspan
by William B. Wharton
their attorney Sept. 27, 1927.  
V. M. WADE ET AL  
1,643,357  
PARTITION ASSEMBLING MACHINE  
Filed Dec. 1, 1925    7 Sheets-Sheet 4

INVENTORS  
Verner M. Wade and Charles E. Zuspan  
by William B. Wharton  
their attorney Sept. 27, 1927.  1,643,357
V. M. WADE ET AL
PARTITION ASSEMBLING MACHINE
Filed Dec. 1. 1925  7 Sheets-Sheet 5
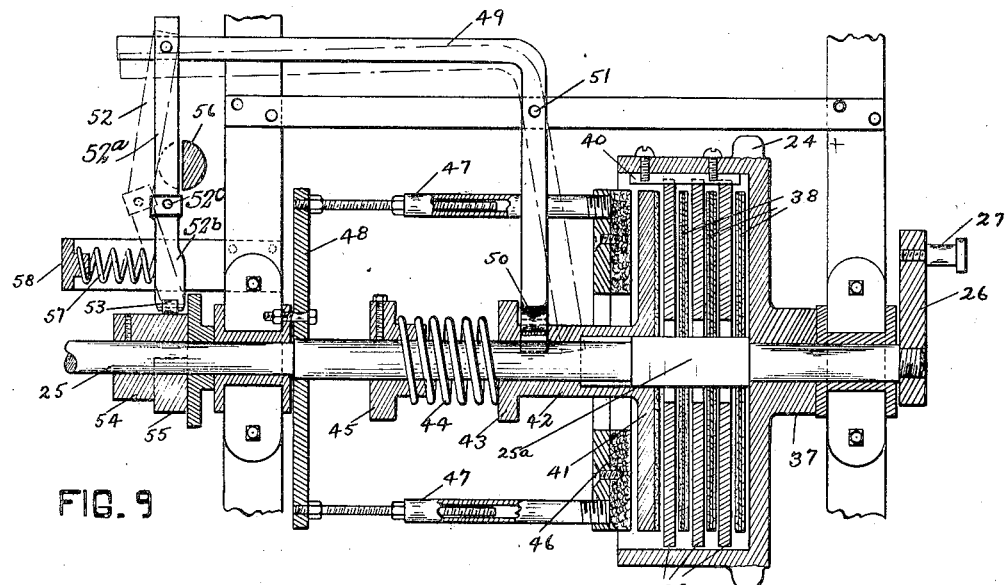
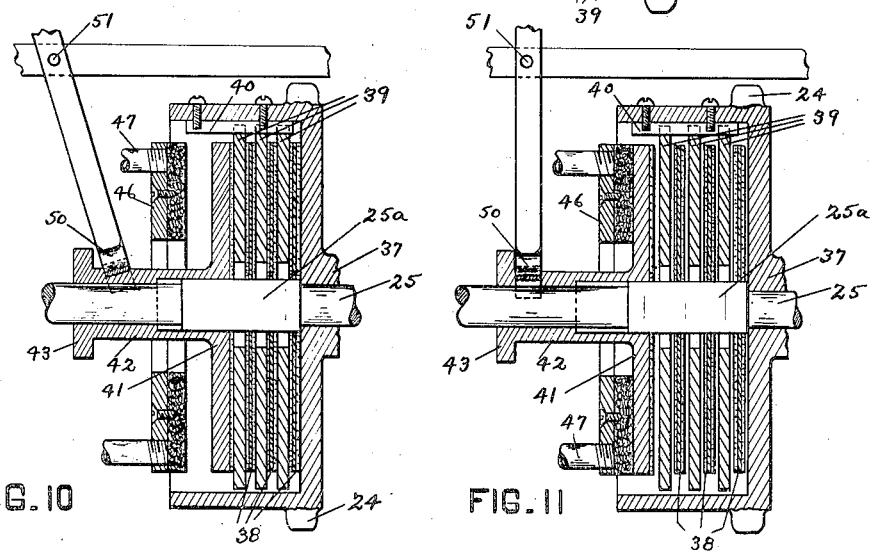
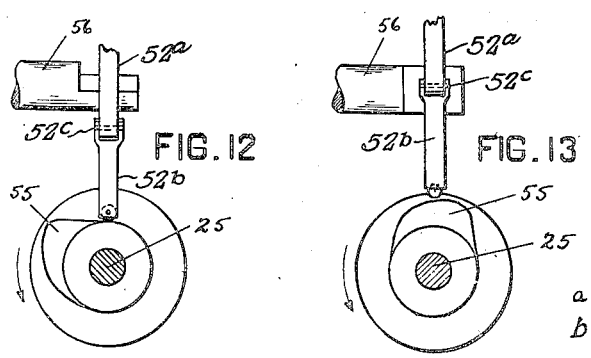
INVENTORS
Verner M. Wade
and Charles E. Zuspan
by William B. Wharton
their attorney

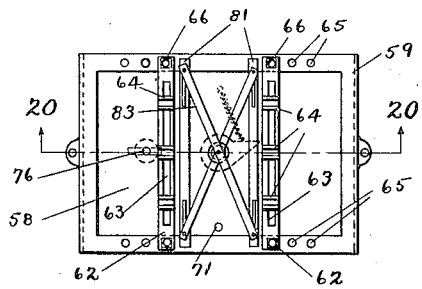
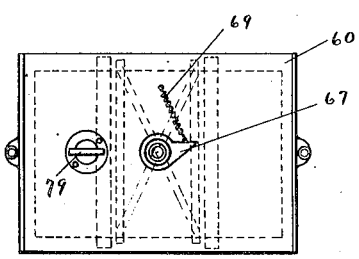
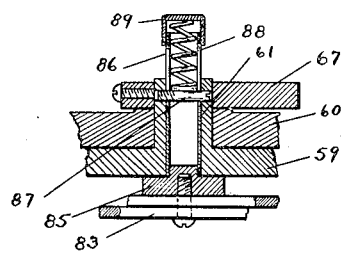
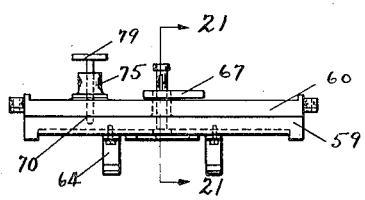
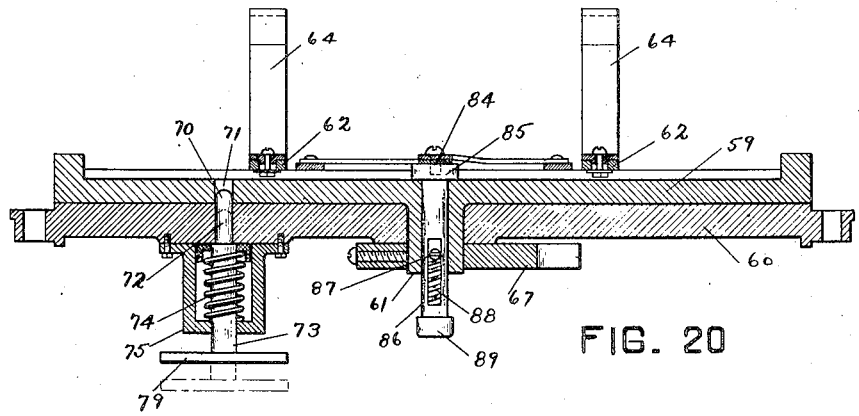
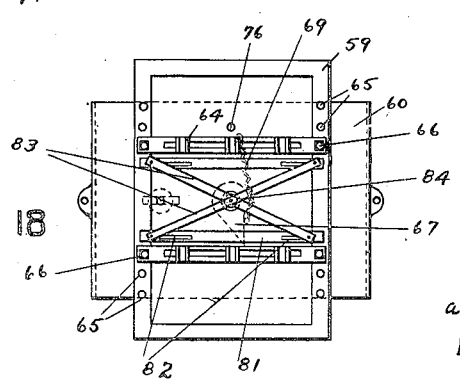

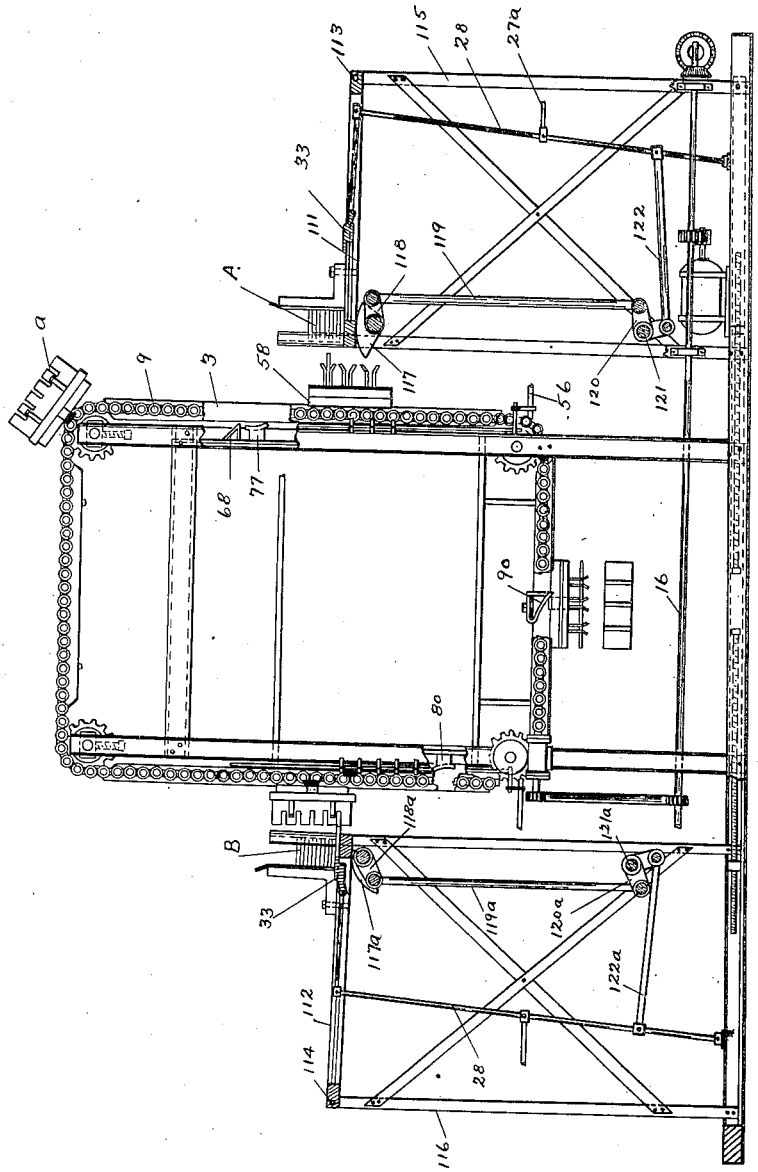

Patented Sept. 27, 1927.

1,643,357

UNITED STATES PATENT OFFICE.

VERNER M. WADE AND CHARLES E. ZUSPAN, OF FAIRMONT, WEST VIRGINIA, ASSIGNORS TO FAIRMONT BOX COMPANY, OF FAIRMONT, WEST VIRGINIA, A CORPORATION OF NEW YORK.

PARTITION-ASSEMBLING MACHINE.

Application filed December 1, 1925. Serial No. 72,520.

This invention relates to a partition assembling machine.

In packing fragile articles such as eggs, glass jars, and similar articles, it is customary to insert partition members in the containing boxes or cartons to protect the articles from breakage due to their mutual contact in the box or carton. The partition members are formed of crossed partition pieces providing a plurality of cubicles or compartments for the reception of the articles to be contained in the boxes or cartons. Such paste board partitions for boxes and cartons are formed of partition pieces or strips, which are slotted for approximately half their height. The partitions are assembled by taking a certain number of such slotted partition pieces or strips, setting them on end with their slots in exposed position, and inserting other strips at right angles to those first taken in such manner that the slots of one set of partition pieces match with the slots of the other set. A partition member is thus formed which provides a plurality of cubicles or compartments, the height of the completed partition, owing to the matching of the slots in the partition pieces, being approximately equal to that of the partition pieces individually.

Figure 1:
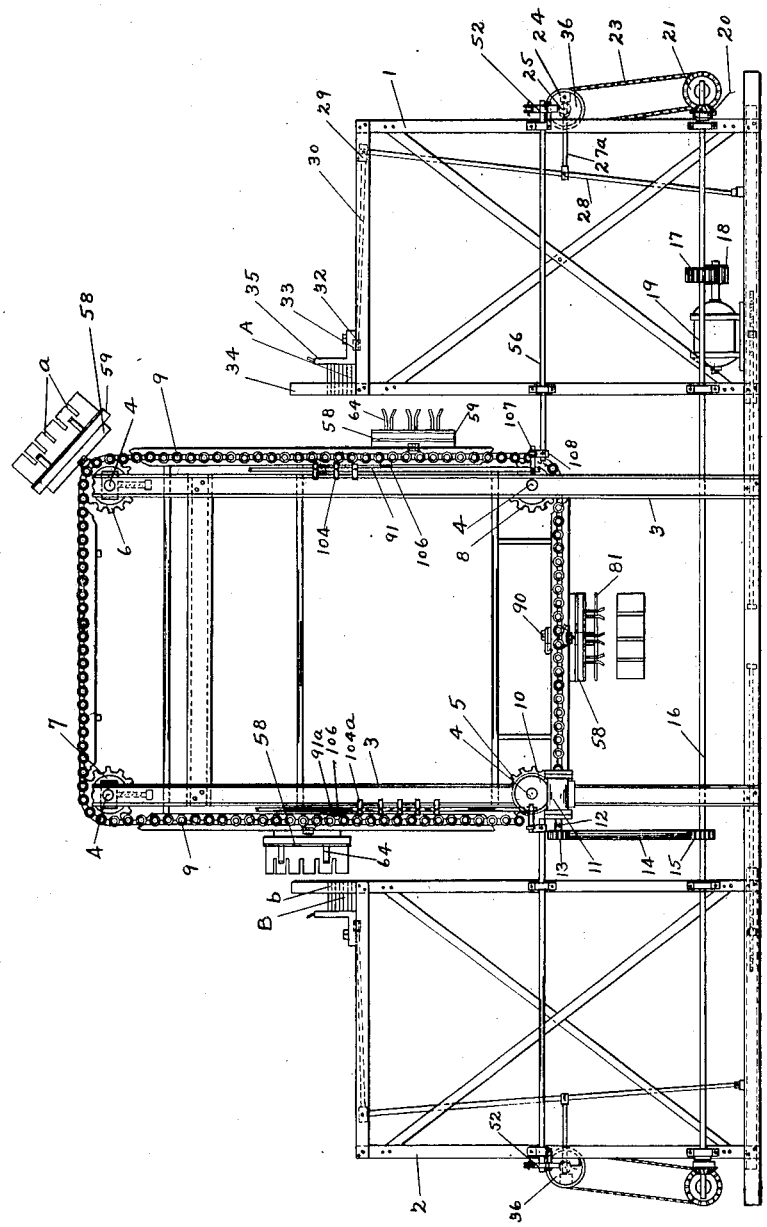
Figure 2:
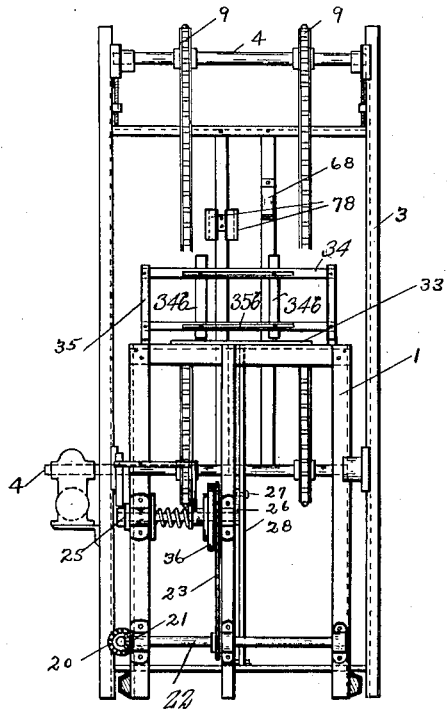
Figure 14:
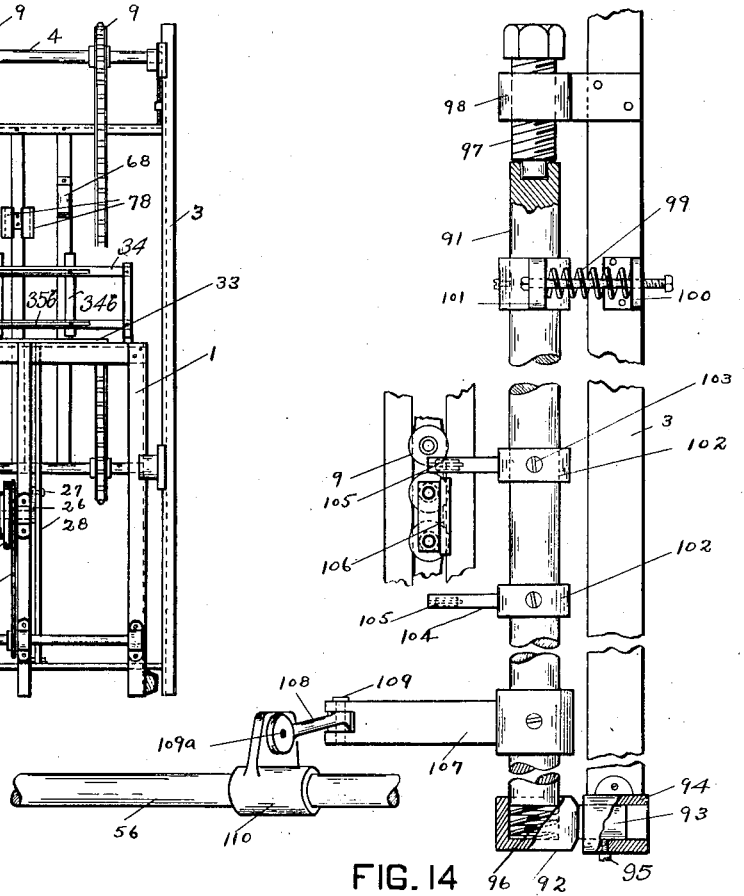
Figure 3:
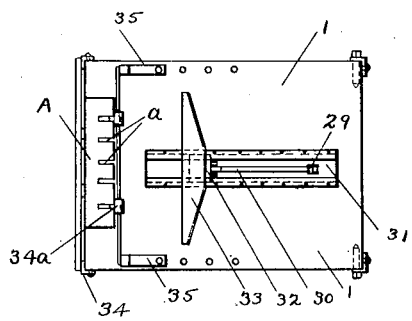
Figure 15:
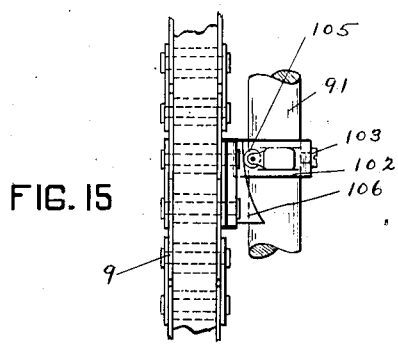
Figure 4:
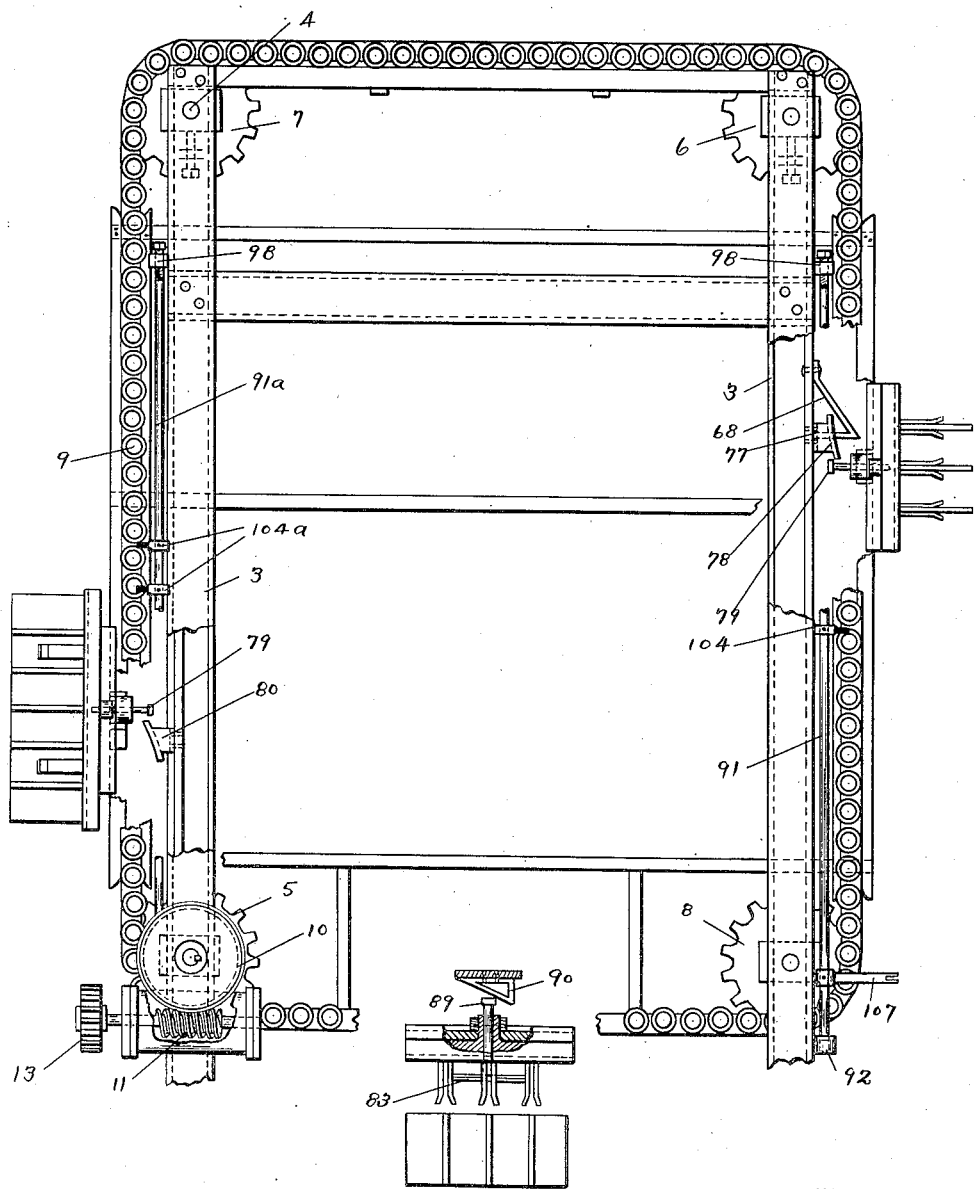
Figure 7:
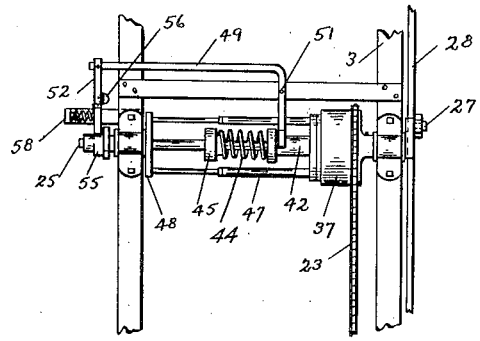
Figure 8:
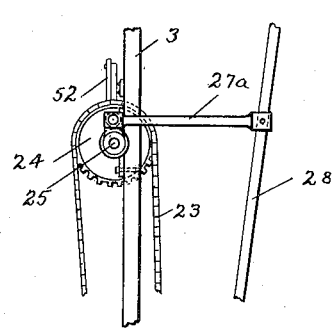
Figure 6:
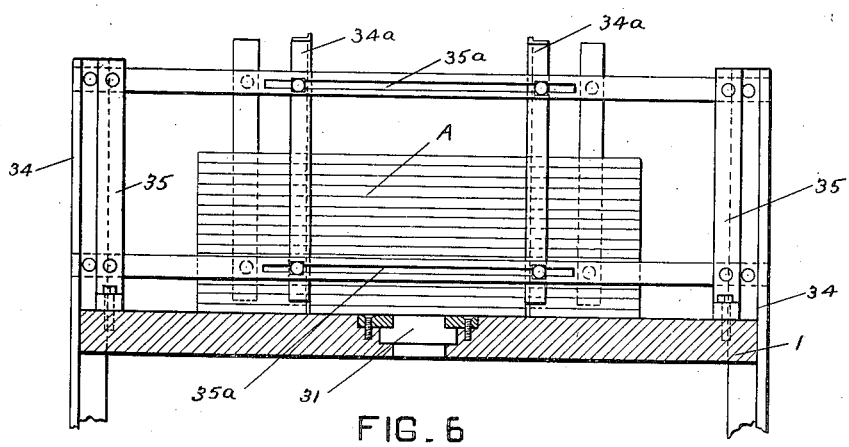
Figure 5:
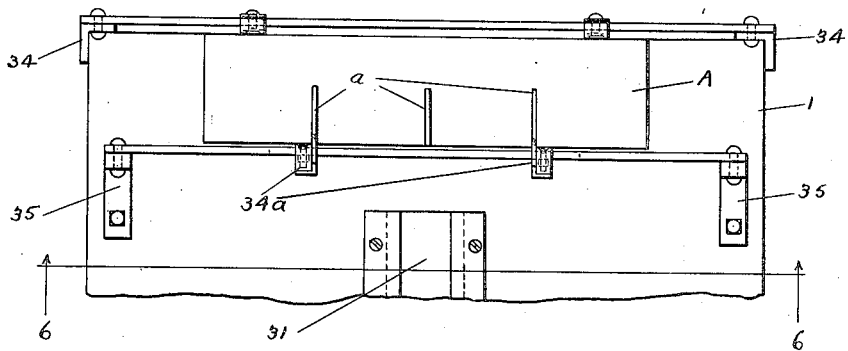

In the accompanying drawings Figure 1 is a side elevation of the complete partition assembling machine of the present invention; Figure 2 is a front elevation thereof; Figure 3 is a plan view of one of the striker tables of the machine for supporting partition pieces and propelling them into the carrier of the machine; Figure 4 is a side elevation of the conveyor of the machine and the supporting frame therefor, said drawing being broken away at several points to show the immediate actuating means for the conveyor and the cam action for operating the movable elements of the carriers supported by the conveyor; Figure 5 is a detail plan view of the forward portion of one of the tables of the machine; Figure 6 is a vertical sectional view on the line 6—6 Figure 5; Figure 7 is a detail view showing in front elevation the clutch mechanism associated with a table and a portion of the connections for actuating the striker plate of a table; Figure 8 is a detail view showing in side elevation the mechanism illustrated in Figure 7; Figure 9 is a vertical sectional view through the clutch mechanism; Figure 10 is a fragmentary vertical sectional view showing the clutch disks, and their associated elements, in operative position to produce actuation of the striker plate of the table; Figure 11 is a similar view showing the clutch disks, and their associated mechanism, in inoperative position; Figure 12 is a detail elevation of the means for controlling the clutch mechanism, showing the same in position to release the operating connections of the clutch and render the clutch disks operative; Figure 13 is a similar view, but shows the parts in position to lock the operating connections of the clutch and maintain the disks in disengaged position; Figure 14 is a detail view of a portion of mechanism for connecting the conveyor of the machine with the clutches on the tables and for timing the operation of the clutches; Figure 15 is a detail view of one of the timing elements of such mechanism; Figure 16 is a rear elevation of one of the carriers for receiving and conveying partition pieces; Figure 17 is a front elevation of a carrier; Figure 18 is a front elevation of a carrier showing the plate thereof which receives partition pieces in a position at ninety degrees to the position shown in Figure 17; Figure 19 is an end elevation of a carrier; Figure 20 is a central longitudinal section through a carrier, taken on the line 20—20 Figure 17 but on a larger scale than such figure; Figure 21 is a fragmentary cross sectional view on the line 21—21 of Figure 19; and Figure 22 is a side elevation of the machine, broken away in parts, illustrating certain modifications over the structure shown in the preceding figures.

The machine of the present invention comprises primarily two tables 1 and 2 for receiving partition pieces and embodying the mechanism for propelling them into the carrying means of the machine; and a frame 3 supporting the carrying means and associated elements of the machine.

Mounted in the frame 3 are a plurality of shafts 4, which carry four pairs of sprockets 5, 6, 7, and 8 around which pass two continuous sprocket chains 9. That one of the shafts 4 which carries the sprockets 5 has thereon a worm gear 10 engaging with a worm 11, for actuating this sprocket and the sprocket chain 9. Worm 11 is mounted on a shaft 12, which has thereon a pinion 13. This pinion 13 meshes with a chain belt 14 meshing in turn with a pinion 15 on the lay shaft 16. Lay shaft 16 is driven through pinions 17 and 18 by an electric motor 19.

On the extremity of lay shaft 16 which is adjacent the table 1, is a bevel pinion 20 meshing with a bevel gear 21 on a cross shaft 22. Shaft 22 has a flexible connection by means of a chain 23 and sprocket 24 with a shaft 25, having thereon a crank 26 connected by a crank pin 27 and arm 27ᵃ with a pivoted rod 28.

Rod 28 has also a pivoted connection 29 with an arm 30, which lies in a slot 31 in the upper portion of the table 1. Arm 30 carries a cross head 32 which has thereon a flat striker plate 33. Partition pieces A, having therein slots a extending substantially half their width are stacked on the table between a fixed frame 34 and an adjustable rear frame 35. Actuation of the striker plate 33 serves to propel the bottommost partition piece A of the stack outwardly from the table.

It will be noted that the partition pieces A are stacked on the table with their slots a toward the rear, that is toward the striker plate 33. The position of the partition pieces laterally of the table is determined by angle bars 34ᵃ, which project into the slots a and are adjustable in slots 35ᵃ in the rear frame 35.

Actuation of striker plate 33 is rendered intermittent by means of clutch mechanism, which is indicated generally by the reference numeral 36 in Figure 2 of the drawings. This clutch mechanism is described, and claimed, in copending application Serial No. 72,519 filed Dec. 1, 1925.

In the structure of the clutch, a clutch casing 37 is freely rotatable on the shaft 25, and carries the sprocket 24 around which passes sprocket chain 23. On the squared portion 25ᵃ of shaft 25 are a plurality of clutch disks 38 with compressible facings of frictional material; and alternating with these disks are a plurality of metallic disks 39, which are slidably supported in the casing 37 by means of partitions 40. An operating disk 41, arranged to cooperate with the other clutch disks, has a shank 42 slidable on the shaft 25, and is provided adjacent its outer extremity with a collar 43. Surrounding the shaft 25 is a coiled spring 44 which bears against a fixed collar 45 on the shaft and against the collar 43 on the shank of disk member 41. Adjacent the outer face of movable disk member 41 is a brake disk 46, which is connected by means of adjustable rods 47 with a plate 48 secured to the frame of the table.

In released position of the parts the coiled spring 44 forces movable disk 41 inwardly to cause frictional engagement of the clutch disks, and transmit power received by the clutch casing 37 to the shaft 25. This produces rotation of the shaft, and by way of crank 26 and crank pin 27, produces reciprocating movement of the arm 30 and striker plate 33.

The means for withdrawing clutch disk 41 from enagement with the other disks comprise an L shaped arm 49, which has a yoke 50 engaging the collar 43 on the shank 42 of disk member 41, and means for operating such arm. This arm 49 is pivoted at 51 to the frame of the table, and has pivotally connected therewith adjacent its outer extremity a jointed rod 52, comprising the sections 52ᵃ and 52ᵇ and terminating in a roller 53. On the outer extremity of shaft 25, and rotatable therewith, is a bushing 54 having thereon a cam 55. When roller 53 is at the high point of cam 55 and the sections 52ᵃ and 52ᵇ are aligned, as shown in full lines Figure 9, the inner extremity of arm 49, carrying the yoke 50, is forced outwardly to act on the collar 43. This draws disk 41 away from the other disks of the clutch and against the brake disk 46, thus instantaneously stopping rotation of the shaft 25. To let in the clutch the arm 52 is broken at its hinge 52ᶜ, as shown in dotted lines Figure 9 by the rotation of a squared shaft 56. This action is against the resistance of a coiled spring 57, mounted in a bracket 58, which exerts a force tending to maintain arm 52 on cam 55. As in this position lever 49 is released by the shortening of rod 52, coiled spring 44 forces movable disk member 41 inwardly to cause mutual engagement of the clutch disks 38 and 39, and produce rotation of shaft 25.

As soon as squared shaft 56 in its rotation ceases to act on arm 52, spring 57 forces the arm 52 inwardly in position to ride upon the cam 55. When arm 52 reaches the high part of the cam, it again acts on lever arm 49, to withdraw movable clutch disk 41, and bring it into contact with the brake disk 46.

This form of clutch is of particular value in the present machine, because it produces a single, timed, rotation of the shaft 25, and because the crank pin 27 is left in exactly the same position at the end of each revolution of the shaft. The striker is thus moved through the same distance, and at the same speed, upon each actuation.

On the sprocket chain 9, mounted in frame 3, are a plurality of carriers 58. These carriers are formed to receive partition pieces from the tables 1 and 2, and to discharge complete partitions from the machine.

Each of the carriers 58 comprises a forward or outer plate 59 and an inner plate 60, plate 59 having a hub 61 projecting inwardly through the plate 59. Plate 60 is secured to sprocket chain 9 against movement relatively thereto. On the face of plate 59 are frame members or strips 62, provided with longitudinally extending slots 63, and forked members 64 formed of two strips of resilient metal. These forked finger members 64 are slidable in the slots 63 of the frame members 62, so that they may be properly positioned for receiving partition members supplied from the table 1.

In use of the machine, partition pieces A are forced into the finger members 64 from the table 1 as each carrier passes this table. These partition pieces A are forced into the fingers in such position that they are retained with their slots $a$ exposed. In order that the fingers 64 themselves may not cover the slots $a$ of the partition pieces, rough adjustment of the frame members 62, which carry the fingers 64 is provided. This adjustment consists in the provision of a plurality of bolt holes 65 along two sides of the plate 59, so that the frame members may be secured in any one of these holes by means of suitable screws 66. During the progress of the carrier past the table 1 a partition piece A is inserted into each opposed pair of resilient fingers 64 by the action of the striker plate 33 on the table. After each carrier has passed the table 1 the plate 59 is turned through 90 degrees into the position shown in Figure 18 of the drawings. This turning is effected by means of a lug 67 secured to the hub 61 of the plate 59. This lug coming into contact with a member 68 mounted on the frame 3 acts against the resistance of a coiled spring 69 to turn the plate 59. Since the plate 60 is rigidly secured to sprocket chain 9 the turning of the plate 59 is relative to the plate 60.

Plate 59 is maintained in this latter position by means of a pin 70 which passes through matching apertures 71 and 72 in the plates 59 and 60 respectively. Pin 70 is provided with a stem portion 73 of greater diameter which is surrounded by a coiled spring 74 in a housing 75 on the plate 60. While plate 59 is being turned, the pin 70 rides along the surface of the plate until the completion of the movement, when it is in line with the aperture 71 in the plate 59. Spring 74 then forces the pin 70 into the aperture 71 and locks plate 59 in position.

As a preliminary step to the turning of plate 59, pin 70 is necessarily withdrawn from the aperture 76 in plate 59 in which it engages when the plate is in alignment with plate 60. This is effected by means of a member 77, which has two parallel cam arms 78. These arms embrace an elongated head 79 on the stem 73, and as the head 79 slides therealong cause the withdrawal of pin 70 from the aperture 76 against the resistance of the coiled spring 74. This withdrawal permits lug 67, striking the member 68 on frame 3, to rotate the plate 59.

It should be understood that the structure of table 2, together with its clutch and operating connections, is substantially identical with the table 1. The stack of blanks B on this table is, however, arranged with the slots $b$ of the blanks facing forwardly, that is away from the striker plate 33. The position of the partition pieces laterally of the table is determined by angle bars $34^b$ which project into the slots $b$ and are adjustable in slots $35^b$ in the forward frame 34. The positioning of these bars constitutes the only detail in which the table 2 differs from the table 1.

Each carrier passes the table 2 with the plates 59 and 60 at right angles to each other, and with the partition members A disposed at right angles to the partition members B on this table. As the mechanism associated with table 2 is identical with that of table 1, the striker plate 33 on this table serves to propel the partition pieces B outwardly into contact with the partition pieces A in a carrier. This results in an engagement of the partition pieces at the points where they are provided respectively with the slots $a$ and $b$. The slots $a$ of the partition pieces A thus embrace the partition pieces B, while the slots $b$ embrace the partition pieces A. This results in the formation of an assembled partition, which has a depth equal to the width of the unassembled partition pieces.

After passing the table 2, plate 59 of a carrier is restored to its original position. This is effected by means of a cam member 80, which is similar to member 77 and which acts on the head 79 of pin 70 in a similar manner to withdraw pin 70 from aperture 71. The coiled spring 69 then serves to restore the plate 59 to its original position in which it is locked by the entrance of pin 70 into aperture 76.

Means are also provided for positively discharging the completed partition from a carrier, before the carrier is again presented before the table 1 for the insertion of other partitions. For this purpose the front face of the plate 59 is provided with two frame members 81, which have therein slots 82. Crossed bars 83 are slidably mounted in the slots 82 so that the structure formed by the frame members and cross bars may be increased or decreased in width in accordance with the position of the frame members 63 which carry the resilient fingers 64. The cross bars 83 are mutually pivoted at 84 in a block 85 secured to a tubular pin 86. In tubular pin 86 there is a cross pin 87 against which bears a coiled spring 88, also bearing against a cap 89 at the outer extremity of tubular pin 86. When a carrier is progressing in inverted position between tables 1 and 2, the inner extremity of the tubular pin 86 comes in contact with the surface of a cam lug 90, which is secured to the frame 3 of the machine. As tubular pin 86 slides along the surface of lug 90, the pin 86 is forced forwardly against the resistance of coiled spring 88. This carries the knock-off structure, comprising the frame members 81 and crossed bars 83 outwardly from the face of plate 59 a sufficient distance to loosen the partition from engagement in the resilient fingers 64, so that it falls from the carrier.

The plate 59 being restored to its original position, and the partition which has been assembled having been discharged from the carrier, the carrier 58 is thus in condition to receive another set of partition pieces A from table 1. As the carriers 58 are in motion at the times when the striker plates 33 of the tables 1 and 2 propel partition pieces A and B into position in the carriers, it is necessary that timing means be provided for controlling the action of the striker in accordance with the movement of the striker chain 9 to which the carriers 58 are secured. Such timing means are associated with the frame 3 of the machine, and cooperate with the clutch mechanism 36 of both the tables 1 and 2.

The timing means comprise primarily vertically extending shafts 91 and 91ª cooperating respectively with the table 1 and table 2. At their lower extremities both of these shafts are supported by brackets 92, which have thereon trunnions 93 extending into bearings 94 secured to the frame 3. The brackets 92 are thus rotatable in the bearings to secure accurate vertical positioning of the shafts, and the brackets are held in adjusted position by means of set screws 95 bearing against the trunnions 93. In the bearings 92 are coiled springs 96 against which the lower extremities of the shafts 91 and 91ª rest.

At their upper extremities the shafts 91 and 91ª engage with bolts or set screw 97, which have a threaded engagement in brackets 98 secured to the frame 3. As the springs 96 exert a force constantly tending to press the shafts 91 and 91ª upwardly, the shafts are susceptible of a slight vertical adjustment by adjusting the position of the regulating bolt or screw 97 in the bracket 98.

The shafts 91 and 91ª are yieldingly held against rotation by means of coiled springs 99, mounted between lugs 100 on the frame 3 and collars 101 on the shafts 91 and 91ª.

On the shaft 91 are a plurality of collars 102, secured to the shaft by means of set screws 103, and which carry contact lugs 104. These contact lugs 104 project toward the sprocket chain or conveyor 9, and have rollers 105 mounted thereon. On sprocket chain 9, and adjacent each of the carriers 58, is a contact cam 106. As each of these cams 106 comes in contact with the roller 105 on one of the lugs 104, it produces an oscillation of the shaft 91. As soon as any contact cam 106 has passed one of the lugs 104, the shaft is restored to its original position by the action of coiled spring 99.

This movement is transmitted by means of an arm 107 secured to the shaft 91, and forked at its outer extremity for the reception of a crank 108, which is loosely mounted on a pin 109 in this forked portion. Crank 108 is connected by means of a pin 109ª with a lugged collar 110 on a horizontally extending shaft 56. This shaft 56 is the previously described shaft 56, which has a squared portion arranged to cooperate with the clutch mechanism 36 of the table 1. Oscillation of the shaft 91 thus produces an actuation of the plunger 33 on table 1, for propelling a partition piece A into one of the fingers 62 on plate 59.

In order that this mechanism may give a timed actuation the contact lugs 104 must be spaced apart a distance equal to the intervals between the receiving sockets of the fingers 62. In order to allow a slight interval of time for the operation of the mechanism, and in order that the striker plate 33 may lead the carrier slightly, the contact lugs are so adjusted that the cams on the conveyor come in contact with each of them before the corresponding pair of fingers 62 is in line with the lowermost partition piece A which is to be propelled into such pair of fingers. Thus proper lead may be determined by an experimental use of the machine before running it to assemble any given lot of partition pieces, the position of the contact lugs being varied slightly until the striker plate propels partition pieces accurately into each of the fingers of a carrier.

It sometimes happens that the partition pieces will begin to miss all the fingers of a carrier by a slight and equal distance during running of the machine, due to a slight slipping of the clutch or an increased play in the connection between the shaft and clutch. In such case a slight corrected adjustment may be made, without adjustment of the contact lugs 104, by means of the set screw 97 bearing against the upper extremity of the shaft 91. This regulates the disposition of the contact lugs as a set, without affecting their relative mutual position.

On the shaft 91ª are likewise a plurality of collars 102ª, secured to the shaft by means of set screws 103ª, and carrying contact lugs 104ª. These contact lugs 104ª are spaced apart a distance equal to the distance between slots $a$ in the partition pieces A. This is in order that each actuation of the striker plate 33 on the table 2 may propel one of the partition pieces B against the partition pieces A in such manner that the slots a and b coincide. These contact lugs also are so arranged as to provide a lead as each of them is contacted by the cam 106 associated with each of the carriers.

Because of the possibility of mutual spacing of the contact lugs, the tables may furnish partition pieces for carriers having fingers which are unequally spaced, and accommodate for an unequal spacing of the slots in the partition pieces A which are first received by the carrier.

Any uniform inaccuracy in the action of striker plate 33 on the table 2 in propelling partition pieces into the slots a, may likewise be compensated for by use of the set screw 97 at the upper extremity of vertical shaft 91$^a$.

It will be understood that the operating connections from the shaft 91$^a$ to the clutch 36 on table 2 are identical with the previously described connections from vertical shaft 91 to the clutch 36 of table 1.

To summarize the operation of the machine: Partition pieces A and B are placed on the tables 1 and 2 in the positions which have been described. The motor 19 is then energized to operate the sprocket chain conveyor 9 and the operating mechanism of both tables. As each of the carriers 58 approaches the table 1, the contact cam 106 associated with such carrier strikes the contact lugs 104 on shaft 91 to actuate the clutch 36 of table 1 and produce the desired number of timed actuations of the striker plate 33 of such table. Obviously there are as many contact lugs, and actuations of the striker, as there are pairs of fingers on the plate 59 of the carrier.

A partition member A is thus inserted in each pair of the resilient fingers 62, with the slots a thereof in exposed position.

After passing table 1, pin 71 is withdrawn from aperture 76 in the plate 59 by the action of cam member 77 on the head 79 on the stem portion 73 of the pin. The plate 59 is then turned through 90 degrees by the mutual contact of lug 67 on the hub of the plate with member 68 on the frame 3; and the plate is locked in this position by the engagement of pin 70 in aperture 71.

In this position the carrier passes the table 2, and the cam member 106 associated with the carrier coming in contact with the contact lugs 104$^a$ causes the requisite number of timed actuations of the striker plate 33 associated with table 2 to insert partition pieces B in the partition pieces A.

After passing table 2 the carrier plate 59 is restored to its original position by the action of the cam member 80 on the head 79 of pin 70; which withdraws pin 70, and permits spring 74 to act on the plate 59.

After plate 59 has been restored to its original position the knockoff structure is operated by the contact of tubular pin 86 with cam lug 90, to discharge the assembled partition from the carrier. Each carrier is at this point in condition to again receive partition pieces from table 1.

The modification illustrated in Figure 22 of the drawings is for the purpose of accommodating the machine to the assembling of partition pieces of relatively great width. With such partition pieces it is necessary to provide clearance by positioning the tables a relatively greater distance from the frame supporting the conveyor and carrier. With an increase in the distance between the starting point of the partition pieces on the table, and the fingers into which they are to be propelled there is a possibility that the partition pieces will not strike properly in the receiving fingers. Also, in putting in the cross pieces, it is possible that such cross partition pieces will not strike the slots in the partition pieces first received by the carriers. The modification to be described compensates for this tendency.

For this purpose the upper portions 111 and 112 of each of the tables are respectively pivoted at 113 and 114 to the arms 115 and 116 of the tables. This leaves the forward extremity of the tables free. In order that the partition pieces may be propelled at the proper instant and at the proper angle to properly engage in the fingers 62 of a carrier or in the slots a of partition members A, the forward extremity of each table is raised or depressed slightly during the movement of the striker plates 33.

To accomplish this purpose the forward portion of the table 111 is supported by a cam 117. This cam 117 is connected by means of an arm 118 with a rod 119. This rod 119 is in turn connected with one arm of a bell crank lever 120 mounted on a cross shaft 121. The other arm of bell crank 120 is connected by means of rod 122 with the pivoted rod 28.

In operation of this mechanism, movement of the rod 28 in actuating the striker plate 33 is communicated to the cam 117, so that the upper portion 111 of the table is raised by the cam during movement of the striker plate in propelling the partition piece from the table. The partition piece is thus propelled at an upwardly extending angle, so that it follows the movement of the carrier during its progress past the striker of partition pieces on the table.

Similarly the forward portion of table 112 is supported by a cam 117$^a$, which is connected by an arm 118$^a$ with a rod 119$^a$ connected with one arm of a bell crank lever 120$^a$, which is mounted on cross shaft 121$^a$. The other arm of bell crank 120$^a$ is connected by means of an arm 122$^a$ with the pivoted rod 28 for actuating striker plate 33 of this table.

By this means movement of the rod 28 in causing an actuation of the striker plate 33 oscillates cam 117ᵃ so that the forward portion of table 112 rests on a low part of the cam. This downward movement follows the movement of the carrier and causes a partition piece to be propelled from the stack on the table at a downwardly extending angle. This insures engagement of the partition pieces B in the slots $a$ of the partition pieces A progressing downwardly past the table.

The advantages of the machine as a whole, and of the various sub-combinations thereof hereinbefore described will be appreciated by those skilled in the art to which the invention pertains.

What we claim is:

1. In a partition assembling machine the combination of a carrier for partition pieces, a conveyor therefor, a reciprocated striker for inserting partition pieces in said carrier, and timing means for controlling the operation of the striker.

2. In a partition assembling machine the combination of a carrier arranged to receive partition pieces, a conveyor for said carrier, a pair of strikers for inserting partition pieces in said carrier and disposed in mutually spaced relation with respect to the conveyor, and timing connections actuated by the conveyor for controlling the operation of each striker.

3. In a partition assembling machine the combination of a carrier plate arranged to receive partition pieces, a conveyor for said carrier plate, a pair of strikers for inserting partition pieces in said carrier and disposed in mutually spaced relation with respect to the conveyor, timing connections actuated by the conveyor for controlling the operation of each striker, and means for rotating the carrier plate through ninety degrees during its progress between the strikers.

4. In a partition assembling machine the combination of a carrier for receiving partition pieces, a conveyor therefor, a striker for inserting partition pieces in said carrier, and timing connections for said striker, said connections comprising a plurality of mutually spaced members so arranged in the path of movement of the conveyor that progress of the conveyor serves to actuate the timing connections and thereby control operation of the striker.

5. In a partition assembling machine the combination of a conveyor, a carrier on said conveyor, spaced members for engaging partition pieces on said carrier, a striker for inserting partition pieces in said members, and timing members adjusted in accordance with the mutual spacing of the engaging members of the carrier for engaging cooperating members on the conveyor to control the operation of the striker to insert partition pieces in the carrier during progress thereof.

6. In a partition assembling machine the combination of a conveyor, a carrier on said conveyor arranged to engage slotted partition pieces with the slots thereof in exposed position, a striker arranged to insert cross pieces in the slots of the partition pieces first received by the carrier, and timing members adjusted in accordance with the mutual spacing of the slots in the partition pieces first inserted for engaging cooperating members on the conveyor to control the operation of the striker to insert cross pieces in such slots during progress of the carrier.

7. In a partition assembling machine the combination of a conveyor, a carrier on said conveyor having thereon spaced members ar- pair of strikers for inserting partition pieces with the slots thereof in exposed position, a pair of strikers for inserting partition pieces in said carrier and for inserting cross pieces in the slots of the partition pieces first received by the carrier, timing connections regulated in accordance with the spaces between the partition engaging members for controlling the action of one striker, and timing connections regulated in accordance with the spacing of the slots in the pieces first inserted for controlling the action of the other striker.

8. In a partition assembling machine the combination of a conveyor, a carrier plate on said conveyor having thereon spaced members arranged to engage slotted partition pieces with the slots thereof in exposed position, a pair of strikers for inserting partition pieces in said carrier plate and for inserting cross pieces in the slots of the partition pieces first received by the carrier plate, timing connections regulated in accordance with the spacing of the partition engaging members for controlling the action of one striker, timing connections regulated in accordance with the spacing of the slots in the pieces first inserted for controlling the other striker, and means for rotating the carrier plate through ninety degrees in its progress between strikers.

9. As a mechanical combination a rod mounted for oscillatory movement, a member arranged to travel longitudinally of said rod, a plunger mounted for reciprocating movement, a source of power, clutch mechanism for connecting said plunger with said source of power, operating connections between said clutch mechanism and said rod, and mutually contacting members on said rod and on said travelling member for oscillating said rod and actuating said clutch mechanism.

10. As a mechanical combination a rod mounted for oscillatory movement, a member arranged to travel longitudinally of said rod, a plunger mounted for reciprocating movement, a source of power, clutch mechanism for connecting said plunger with said source of power, operating connections between said clutch mechanism and said rod, adjustably spaced contact members on said rod, and contact lugs on said travelling member arranged to contact the members on the rod for oscillating the rod and actuating the clutch mechanism.

11. As a mechanical combination a rod mounted for oscillatory movement and for adjustment in a longitudinal direction, a member arranged to travel longitudinally of said rod, a plunger mounted for reciprocating movement, a source of power, clutch mechanism for connecting said plunger with the source of power, operating connections between said clutch mechanism and the rod, and mutually contacting members on said rod and on said travelling member for oscillating said rod and actuating said clutch mechanism.

12. As a mechanical combination a rod mounted for oscillatory movement and for adjustment in a longitudinal direction, a member arranged to travel longitudinally of said rod, a plunger mounted for reciprocating movement, a source of power, clutch mechanism for connecting said plunger with the source of power, operating connections between said clutch mechanism and said rod, adjustably spaced contact members on said rod, and contact lugs on said travelling member arranged to contact the members on the rod for oscillating the rod and actuating the clutch.

13. A carrier comprising two mutually pivoted plates, means for partially rotating one of such plates relatively to the other of the pair, a removable stop member for maintaining the plates in the relative position produced by such partial rotation, and resilient means arranged to exert a force tending to restore the plates to their initial mutual position.

14. A carrier comprising two mutually pivoted plates, means for partially rotating one of such plates relatively to the other of the pair, a removable stop member for maintaining the plates in the relative position produced by such partial rotation, engaging members on said oscillatory plate, and resilient means arranged to exert a force tending to restore the plates to their initial mutual position.

15. A carrier comprising two mutually pivoted plates, a contact member on one of said plates for partially rotating such plate relatively to the other of the pair, engaging members on such rotatable plate, and an operable knock-off structure arranged to be actuated to discharge from the carrier objects engaged by said engaging members.

16. A carrier comprising two mutually pivoted plates, means for partially rotating one of said plates relatively to the other of the pair, a removable stop member for maintaining the plates in the relative position produced by such partial rotation, engaging members on said rotatable plate, resilient means arranged to exert a force tending to restore the plates to their initial mutual position, and a knock-off structure arranged to discharge from the carrier objects engaged by said engaging members.

17. In a partition assembling machine the combination of a carrier comprising two mutually pivoted plates, a contact member on one of said plates for partially rotating such plate relatively to the other of the pair, and engaging members for partition pieces on such rotatable plate, with a conveyor for the carrier, a member extending into the path of movement of the carrier and arranged to contact the contact member on the rotatable plate of the carrier, a striker for inserting partition pieces in the engaging members of said carrier during progress thereof, and timing means actuated by the conveyor for controlling operation of the striker.

18. In a partition assembling machine the combination of a carrier comprising two mutually pivoted plates, a contact member on one of said plates for partially rotating such plate relatively to the other of the pair, and engaging members for partition pieces on such rotatable plate, with a conveyor for the carrier, a member extending into the path of movement of the carrier and arranged to contact the contact member on the rotatable plate of the carrier, a striker for inserting partition pieces in the engaging members of said carrier, and timing means for controlling the operation of the striker.

19. In a partition assembling machine the combination of a carrier comprising two mutually pivoted plates, a contact member on one of said plates for partially rotating such plate relatively to the other of the pair, and engaging members for partition pieces on such rotatable plate, with a conveyor for said carrier, a member extending into the path of movement of the carrier and arranged to contact the contact member on the rotatable plate of the carrier, a pair of strikers for inserting slotted partition pieces in the engaging means of said rotatable plate and in the slots of the partition pieces first received thereby, and timing connections actuated by the conveyor for controlling the operation of each striker.

20. In a partition assembling machine the combination of a carrier comprising two mutually pivoted plates, one of said plates being rotatable relatively to the other of the pair, and engaging members for partition pieces on such rotatable plate; with a conveyor for said carrier, a pair of strikers for inserting slotted partition pieces in the engaging means of said rotatable plate and in the slots of the partition pieces first received thereby, timing connections actuated by the conveyor for controlling the operation of each striker, and means for rotating the rotatable plate of the carrier through ninety degrees during its progress between the strikers.

21. As a mechanical combination a table mounted for oscillation about a horizontal axis, a reciprocable plunger, operating connections for said plunger, and means actuated by the operating connections of the plunger for raising and lowering the forward extremity of the table in synchronism with movement of the plunger.

22. As a mechanical combination a table mounted for oscillation about a horizontal axis, a reciprocable plunger, a cam in contact with the lower surface of the table adjacent the forward extremity thereof, a supporting and actuating arm therefor, operating connections for the plunger, and connections from the operating connections of the plunger to the cam actuating rod for actuating the cam to raise and lower the forward extremity of the table in synchronism with the movement of the plunger.

23. As a mechanical combination a table mounted for oscillation about a horizontal axis, a reciprocable plunger, a cam in contact with the lower surface of the table adjacent the forward extremity thereof, a supporting and actuating arm for said cam, and means for raising and lowering the forward extremity of the table in synchronism with the movement of the plunger.

24. In a partition assembling machine the combination of a table mounted for oscillation about a horizontal axis, means adjacent the forward extremity of the table for retaining partition pieces, a striker plate mounted for reciprocating movement in said table, means for raising and lowering the forward extremity of the table in synchronism with the movement of the striker plate, a carrier for receiving partition pieces, and conveying means for moving said carrier past said table.

25. In a partition assembling machine the combination of a table mounted for oscillation about a horizontal axis, means adjacent the forward extremity of the table for retaining partition pieces, a striker plate mounted for reciprocating movement in said table, operating connections for said striker plate, means actuated by said operating connections for raising and lowering the forward extremity of the table in synchronism with movement of the striker plate, a carrier for receiving partition pieces, and conveying means for moving said carrier past said table.

26. In a partition assembling machine the combination of a table mounted for oscillation about a horizontal axis, means adjacent the forward extremity of the table for retaining partition pieces, a striker plate mounted for reciprocating movement in said table, a cam in contact with the under surface of the table adjacent the forward extremity thereof, a supporting and actuating arm therefor, operating connections for the striker plate, connections between said operating connections and the actuating arm of the cam for actuating the cam to raise and lower the forward extremity of the table in synchronism with the movement of the striker plate, a carrier for receiving partition pieces, and conveying means for moving said carrier past said table.

27. In a partition assembling machine the combination of a table mounted for oscillation about a horizontal axis, means adjacent the forward extremity of the table for retaining partition pieces, a striker mounted for reciprocating movement in said table, a cam in contact with the lower surface of the table adjacent the forward extremity thereof, a supporting and actuating arm for said cam, means for raising and lowering the forward extremity of the table in synchronism with the movement of the striker plate, a carrier for receiving partition pieces, and conveying means for moving said carrier past said table.

28. In a partition assembling machine the combination of a table mounted for oscillation about a horizontal axis, means adjacent the forward extremity of the table for retaining partition pieces, a striker plate mounted for reciprocating movement in said table, means for raising and lowering the forward extremity of the table in synchronism with the movement of the striker plate, a carrier for receiving partition pieces, conveying means for moving said carrier past said table, and timing connections for synchronizing movement of said striker plate with the progressive movement of said carrier.

29. In a partition assembling machine the combination of a table mounted for oscillation about a horizontal axis, means adjacent the forward extremity of the table for retaining partition pieces, a striker plate mounted for reciprocating movement in said table, operating connections for said striker plate, means actuated by said operating connections for raising and lowering the forward extremity of the table in synchronism with movement of the striker plate, a carrier for receiving partition pieces, conveying means for moving said carrier past said table, and timing connections for synchronizing movement of said striker plate with progressive movement of said carrier.

30. In a partition assembling machine the combination of a table mounted for oscillation about a horizontal axis, means adjacent the forward extremity of the table for retaining partition pieces, a striker plate mounted for reciprocating movement in said table, a cam in contact with the under surface of the table adjacent the forward extremity thereof, a supporting and actuating arm therefor, operating connections for the striker plate, connections between said operating connections and the actuating arm of the cam for actuating the cam to raise and lower the forward extremity of the table in synchronism with the movement of the striker plate, a carrier for receiving partition pieces, and timing connections for synchronizing movement of the striker plate with progressive movement of the carrier.

31. In a partition assembling machine the combination of a table mounted for oscillation about a horizontal axis, means adjacent the forward extremity of the table for retaining partition pieces, a striker mounted for reciprocating movement in said table, a cam in contact with the under surface of the table adjacent the forward extremity thereof, a supporting and actuating arm for said cam, means for raising and lowering the forward extremity of the table in synchronism with the movement of the striker plate, a carrier for receiving partition pieces, conveying means for moving said carrier past said table, and timing connections for synchronizing movement of said striker plate with the progressive movement of said carrier.

32. In a partition assembling machine the combination of a conveyor, a carrier comprising a plate fixed on the conveyor and a plate rotatably mounted on the fixed plate, a member extending into the path of movement of the carrier and arranged to contact the rotatable plate to rotate the same, a spring pressed plunger arranged to engage the rotatable plate to hold the same against rotation, and means extending into the path of movement of the carrier for withdrawing said plunger.

33. In a partition assembling machine the combination of an endless conveyor, a carrier comprising a plate fixed on the conveyor and a plate rotatably mounted on the fixed plate, a member extending into the path of movement of the carrier and arranged to contact the rotatable plate to rotate the same, resilient means exerting a force tending to oppositely rotate the plate, a spring pressed plunger arranged to engage the rotatable plate in two positions thereof, and two members extending into the path of movement of the conveyor at different points and arranged to engage the plunger to withdraw it from the rotatable plate.

34. In a partition assembling machine the combination of a conveyor, a carrier comprising a plate fixed on the conveyor and a plate rotatably mounted on the fixed plate, forked resilient members on said rotatable plate for receiving partition pieces, a knock-off member yieldingly held to the face of the rotatable plate, and a member arranged to extend into the path of movement of the conveyor and contact the knock-off member for discharging partitions from the carrier.

35. In a partition assembling machine the combination of a conveyor, a plate fixed on the conveyor and a plate rotatably mounted on the fixed plate, a member extending into the path of movement of the carrier and arranged to contact the rotatable plate to rotate the same, a spring pressed plunger arranged to engage the rotatable plate to hold the same against rotation, means extending into the path of movement of the carrier for withdrawing said plunger, forked resilient members on the rotatable plate for receiving partition pieces, a knock-off member yieldingly held to the face of the rotatable plate, and a member arranged to extend into the path of movement of the conveyor and contact the knock-off member for discharging partitions from the carrier.

36. In a partition assembling machine the combination of an endless conveyor, a carrier comprising a plate fixed on the conveyor and a plate rotatably mounted on the fixed plate, a member extending into the path of movement of the carrier and arranged to contact the rotatable plate to rotate the same, resilient means exerting a force tending to oppositely rotate the plate, a spring pressed plunger arranged to engage the rotatable plate in two positions thereof, two members extending into the path of movement of the conveyor at different points and arranged to engage the plunger to withdraw it from the rotatable plate, and a member arranged to extend into the path of movement of the knock-off member for discharging partitions from the carrier.

37. In a partition assembling machine the combination of a carrier, a conveyor therefor, mutually adjustable fingers for receiving partition pieces on said carrier, a striker for inserting partition pieces in said carrier, and timing connections for said striker, said connections comprising a plurality of members in mutually adjustable spaced relation so arranged that progress of the conveyor serves to actuate the timing connections and control operation of the striker in accordance with the adjustment of such members.

38. In a partition assembling machine the combination of a carrier, a conveyor therefor, mutually adjustable fingers for receiving slotted partition pieces with the slots thereof in exposed position, two strikers for inserting partition pieces in the carrier, and timing connections for said striker; said connections comprising a plurality of members adjustably extending into the path of movement of the conveyor and mutually adjustable in accordance with the mutual adjustment of the fingers, and a plurality of members extending into the path of movement of the carrier and adjustable in accordance with the mutual spacing of the slots in the partition pieces, the timing connections being so arranged that progress of the conveyor serves to actuate the timing connections for the strikers in accordance with the adjustment of such members.

In witness whereof, we hereunto set our hands.

VERNER M. WADE.
CHARLES E. ZUSPAN.